(12) United States Patent
Huntsberger et al.

(10) Patent No.: US 6,345,676 B1
(45) Date of Patent: Feb. 12, 2002

(54) BUBBLE-PRODUCING RIDE-ON VEHICLE

(75) Inventors: Kurt J. Huntsberger, Chaffee; John L. Jones, Jr., East Aurora, both of NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 09/499,585

(22) Filed: Feb. 7, 2000

(51) Int. Cl.$^7$ ............... B60K 1/00; B05B 9/00
(52) U.S. Cl. ............. 180/65.1; 239/156; 239/289; 446/15; 446/16; 446/17; 446/18; 446/409; 446/440
(58) Field of Search .................... 239/156, 289; 180/65.1, 53.6; 446/454, 409, 16, 15, 17, 18, 440

(56) References Cited

U.S. PATENT DOCUMENTS

| | | |
|---|---|---|
| 2,579,714 A | 12/1951 | Treuthart |
| 2,675,641 A | 4/1954 | Baggott |
| 2,805,515 A | 9/1957 | Gans et al. |
| 3,002,314 A | 10/1961 | Brottman |
| 3,008,263 A | 11/1961 | Ellman |
| 3,093,925 A | 6/1963 | Greene |
| 3,228,136 A | 1/1966 | Rouse |
| 3,246,418 A | 4/1966 | Andersen et al. |
| 3,246,419 A | 4/1966 | Pawelka et al. |
| 3,665,637 A | 5/1972 | Starr |
| 3,708,909 A | 1/1973 | Winston |
| 3,738,051 A | 6/1973 | Wakeem |
| 3,775,899 A | 12/1973 | Wolf |
| 3,913,260 A * | 10/1975 | Corbett ............ 446/15 |
| 4,016,673 A | 4/1977 | Constance |
| 4,062,143 A | 12/1977 | Lerman |
| 4,128,962 A | 12/1978 | Anderson |
| 4,184,284 A | 1/1980 | Rogahn |
| 4,367,608 A | 1/1983 | Melotti |
| 4,447,982 A * | 5/1984 | Gushea ............ 446/15 |
| 4,556,392 A | 12/1985 | Chang |
| 4,560,022 A * | 12/1985 | Kassai ............ 180/65.1 |
| 4,576,582 A | 3/1986 | Panzarella |
| 4,700,965 A | 10/1987 | Kinberg |
| 4,764,141 A | 8/1988 | D'Andrade |
| D300,619 S | 4/1989 | Phinney et al. |
| RE32,973 E | 7/1989 | Panzarella |
| 5,078,636 A | 1/1992 | Clarke et al. |
| 5,135,422 A | 8/1992 | Bowen |
| 5,269,715 A * | 12/1993 | Silveria et al. .......... 446/16 X |
| 5,348,507 A * | 9/1994 | McGhie et al. ............ 446/16 |
| 5,366,402 A * | 11/1994 | Rudell et al. .......... 446/409 X |

(List continued on next page.)

FOREIGN PATENT DOCUMENTS

| | | | |
|---|---|---|---|
| EP | 094 532 | 11/1983 | |
| GB | 11889868 | 4/1970 | |
| GB | 1476049 | * 12/1975 | ........... 446/15 X |
| GB | 2186199 | 8/1987 | |
| GB | 2224950 | * 5/1990 | ........... 446/15 |
| GB | 2266061 | * 10/1993 | ........... 446/15 |
| JP | 8-72562 | 3/1996 | |
| JP | 9-192438 | 7/1997 | |

OTHER PUBLICATIONS

Toys–R–Us advertisement, 1985.
Fisher–Price Catalog, p. 58, 1987.

Primary Examiner—Lanna Mai
Assistant Examiner—Toan To
(74) Attorney, Agent, or Firm—Kolisch, Hartwell, Dickinson, McCormack & Heuser, PC

(57) ABSTRACT

A children's ride-on vehicle that resembles a riding lawn-mower or tractor. Th vehicle includes a drive assembly with a battery-powered motor, and a frame that is adapted to support a child. The ride-on further includes a bubble-producing mechanism adapted to produce a stream of bubbles, such as to simulate the stream of clippings discharged by a full-size mower or tractor.

46 Claims, 5 Drawing Sheets

U.S. PATENT DOCUMENTS

| | | |
|---|---|---|
| 5,395,274 A | 3/1995 | Myers |
| 5,439,071 A * | 8/1995 | Rodriguez-Ferre ..... 180/65.1 X |
| 5,462,469 A * | 10/1995 | Lei ............................ 446/15 |
| 5,495,876 A | 3/1996 | Schramm |
| 5,603,651 A | 2/1997 | Shure et al. |
| 5,620,351 A | 4/1997 | Ho |
| 5,643,035 A | 7/1997 | Freese et al. |
| 5,746,636 A | 5/1998 | Cernansky et al. |
| 5,842,899 A | 12/1998 | Cernansky et al. |
| 5,845,724 A * | 12/1998 | Barrett ...................... 180/65.1 |
| 5,908,057 A | 6/1999 | Schramm |
| 6,024,623 A * | 2/2000 | Menow et al. ................ 446/15 |

* cited by examiner

BUBBLE-PRODUCING RIDE-ON VEHICLE

FIELD OF THE INVENTION

The invention relates generally to children's ride-on vehicles, and more particularly to a bubble-producing children's ride-on vehicle.

BACKGROUND AND SUMMARY OF THE INVENTION

Ride-on vehicles for children have become increasingly popular due in part to the desire of children to drive self-propelled vehicles resembling full-size vehicles. Such ride-on vehicles, or ride-ons, are typically propelled by battery-powered motors and generally include scaled-down features of full-size vehicles, such as cars and trucks. These vehicles enable a child to steer and otherwise drive a vehicle, simulating an adult driving a full-size vehicle. However, a child's desire to emulate the actions of his or her parents or older siblings extends to other activities other than driving an automobile. Reduced-scale ride-on vehicles that simulate other fall-size vehicles would enable children to further imitate the actions of their parents, however, these vehicles must be adapted to be safe and also entertaining for children.

The invented ride-on includes a drive assembly with a battery-powered motor, and a frame that is adapted to support a child and resemble a full-size riding lawnmower or tractor. The ride-on further includes a bubble-producing mechanism adapted to produce a stream of bubbles, such as to simulate the stream of clippings discharged by a fall-size mower or tractor.

DETAILED DESCRIPTION OF THE PREFERRED EMBODIMENTS AND BEST MODE OF THE INVENTION

Figure 1:
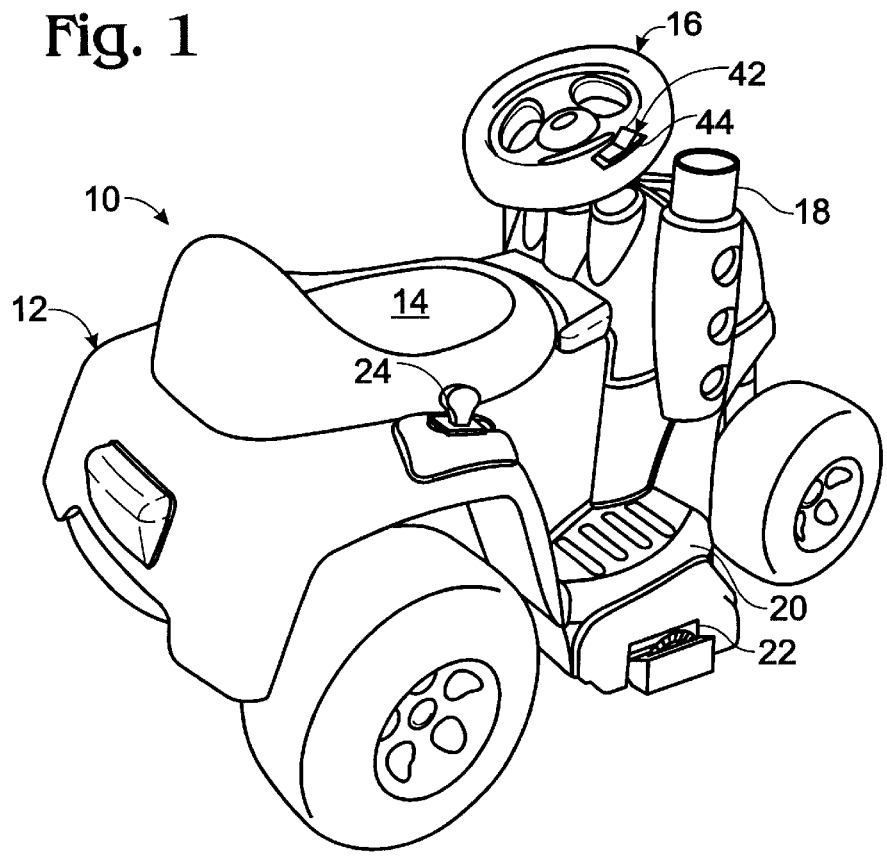
FIG. 1 is a rear perspective view showing a children's ride-on vehicle according to the present invention.
Figure 2:
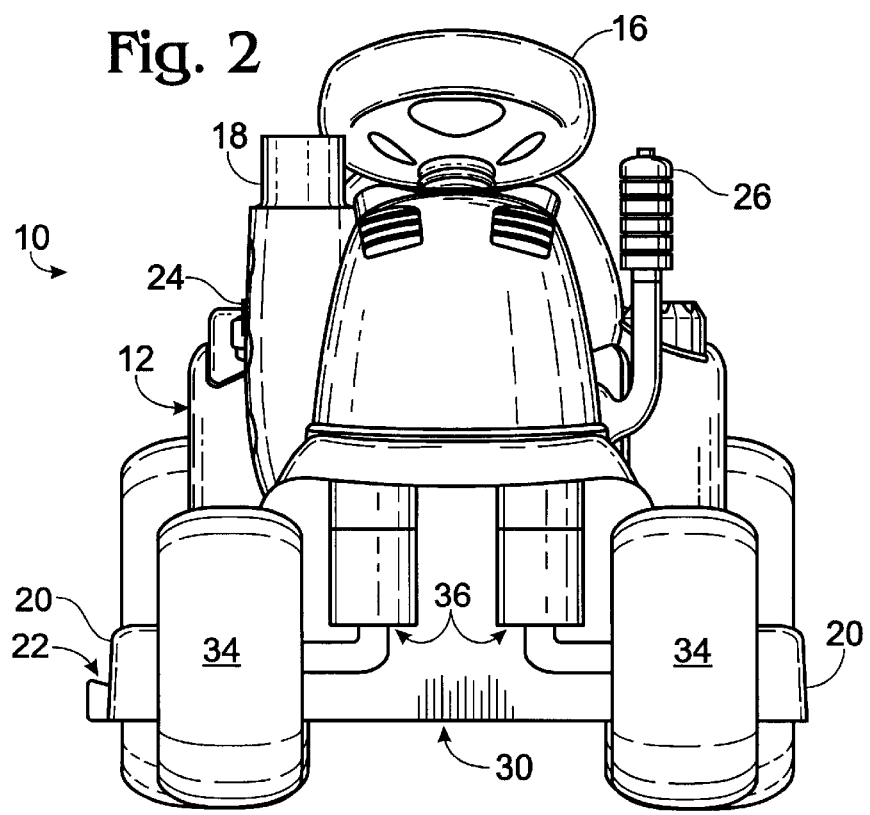
FIG. 2 is a front elevation view of the vehicle of FIG. 1.
Figure 3:
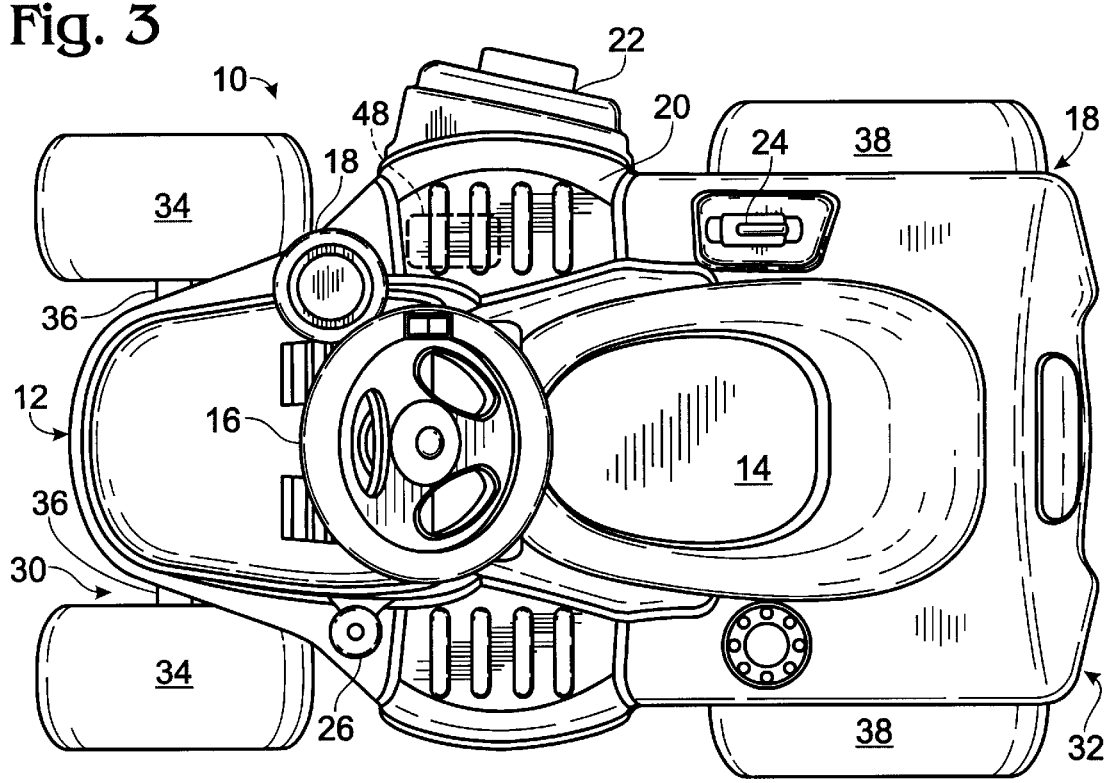
FIG. 3 is a top plan view of the vehicle of FIG. 1.

A children's ride-on vehicle, or ride-on, constructed according to the present invention is shown in FIGS. 1–3 and generally indicated at 10. As shown, vehicle 10 generally resembles a reduced-scale riding lawnmower or tractor. Ride-on 10 includes a frame, or vehicle body, 12. Frame 12 typically is formed from molded plastic parts that are secured together by screws or other suitable fasteners. As shown in FIGS. 1–3, frame 12 is shaped to resemble components of a conventional riding lawnmower, including a seat 14, a steering mechanism including a steering wheel 16, an exhaust pipe 18, a mower deck 20 with a "grass" discharge port 22, a shifter 24, and a pivotal "deck adjustment" arm 26, which is shown in FIGS. 2 and 3.

Ride-on 10 further includes front and rear wheel-and-axle assemblies 30 and 32. Each assembly 30 and 32 includes at least one wheel and an axle or other suitable mechanism for rotatably coupling the wheels to the vehicle. For example, as shown in FIG. 2, front assembly 30 includes front wheels 34 that are each rotatably mounted on spindle mounts 36. Wheels 34 may also be referred to as steerable wheels because assembly 30 is coupled to the vehicle's steering mechanism, and front wheels 34 are thereby steered responsive to a child sitting on seat 14 turning steering wheel 16. It should be understood that the steering mechanism may include a handlebar in place of wheel 16, for example, depending upon the particular type of full-sized vehicle ride-on 10 is meant to simulate.

Figure 5:
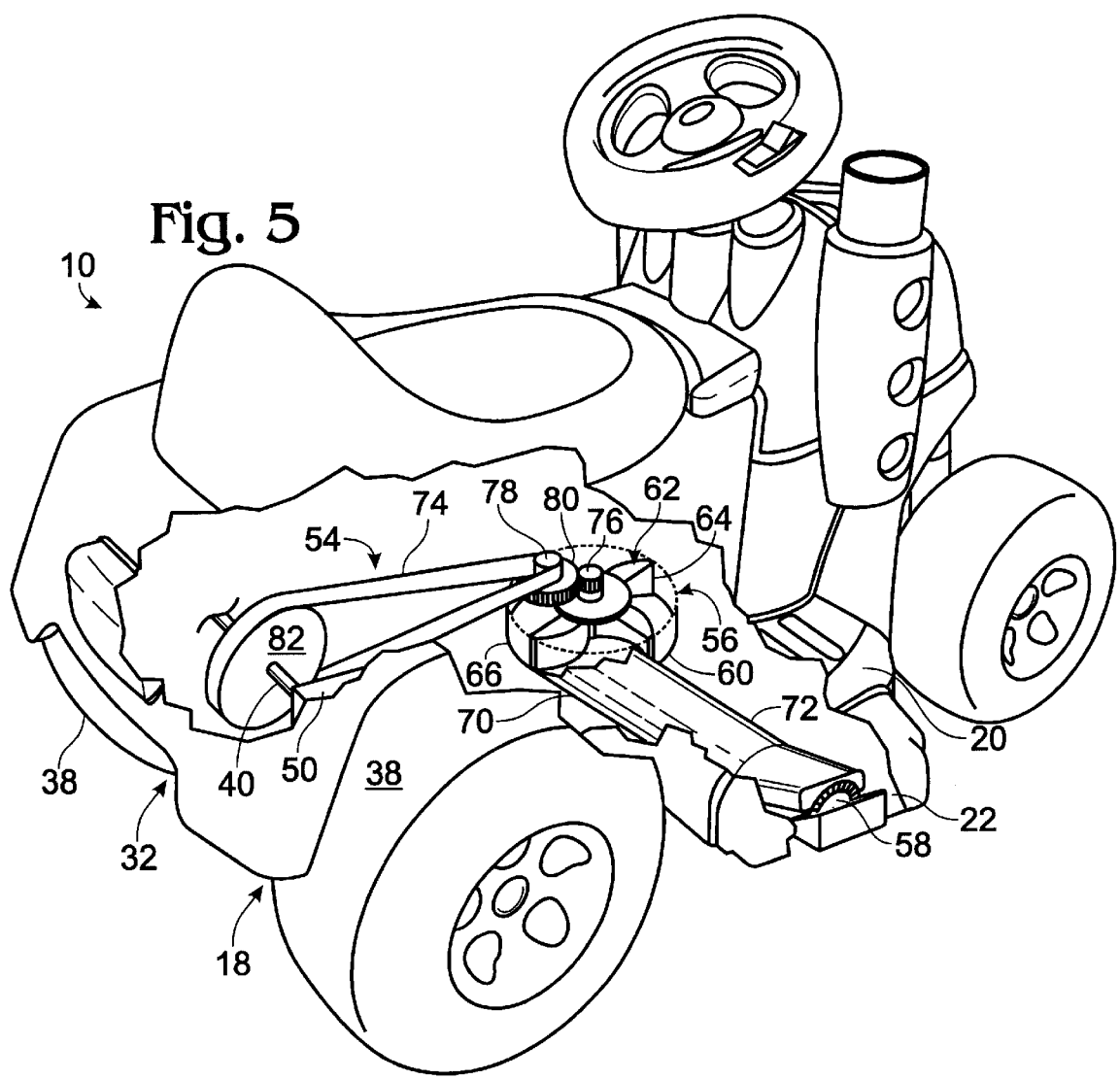
FIG. 5 is a fragmentary rear perspective view showing an embodiment of the bubble-producing mechanism and wheel-and-axle assembly of FIG. 4 implemented on the vehicle of FIG. 1.

Rear assembly 32 includes rear wheels 38, which are rotatably mounted on an axle 40, which is shown in FIG. 5. Rear wheels 38 may also be referred to as driven wheels because axle 40 is rotatably driven by the vehicle's motor assembly, and rear wheels 38 are thereby driven responsive to a user manipulable switch assembly 42. Examples of suitable switch assemblies include, for example, an on/off switch 44 (shown in FIGS. 1 and 3), a foot pedal 46 (shown in dashed lines in FIG. 3), or any other suitable mechanism for enabling a user to selectively actuate the ride-on's motor assembly.

Figure 4:
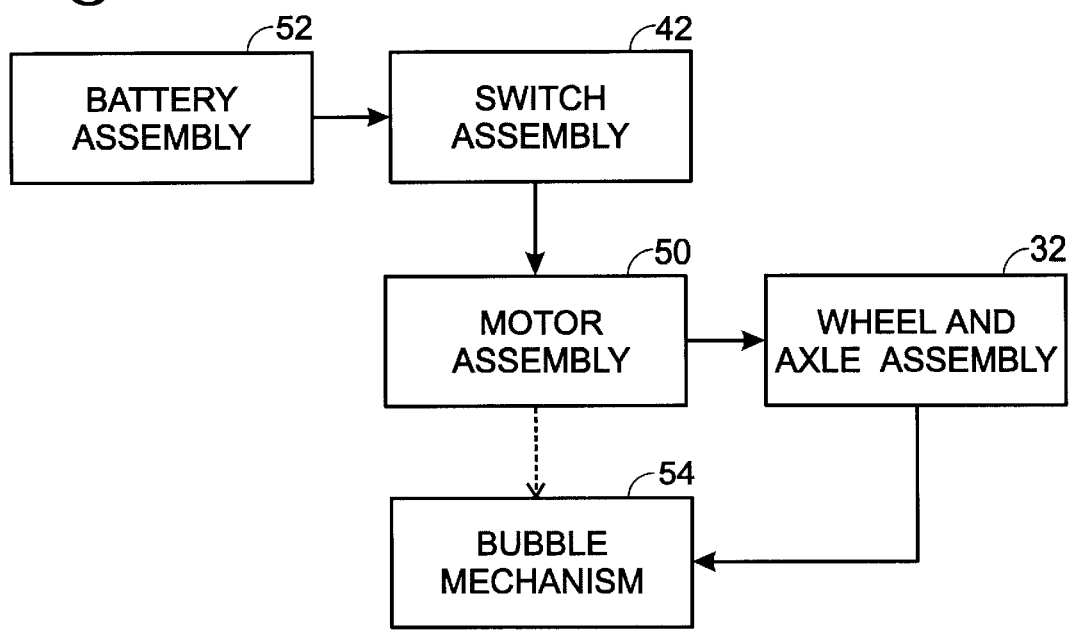
FIG. 4 is a schematic diagram showing the bubble-producing mechanism and motor and drive assemblies of the vehicle of FIG. 1.

In FIG. 4, the drive components of vehicle 10 are schematically illustrated. As shown, the vehicle includes an electrically powered motor assembly 50, and a battery assembly 52 adapted to selectively provide power to the motor assembly responsive to user-inputs conveyed through switch assembly 42. Motor and battery assemblies each may include one or more motors or batteries, respectively. It should be understood that motor assembly 50 may also include one or more gears to adjust the speed at which axle 40 is rotated relative to the portion of motor assembly 50 that drives the axle. Battery assembly 52 typically is housed in a user-accessible portion of frame 12 so that the batteries forming battery assembly 52 may be removed and replaced as needed. For example, seat 14 may be removably coupled to the frame to allow access to the batteries.

In addition to the structure described above, switch assembly 42 may include a reversing switch to enable the vehicle to be driven in reverse, and one or more shift levers or throttles to allow the user to selectively regulate the speed at which vehicle 10 travels. An example of a suitable shift mechanism is shown in U.S. Pat. No. 5,644,114 to Neaves, and an example of a suitable foot pedal is shown in U.S. Pat. No. 5,319,996 to Harris. The disclosures of U.S. Pat. Nos. 5,644,114 and 5,319,996 are hereby incorporated by reference.

Also schematically illustrated in FIG. 4 is a bubble mechanism 54 that is adapted to produce and emit through discharge port 22 a stream of soap bubbles, such as to simulate the stream of clippings that would be emitted through the discharge port of a full-size riding lawnmower.

As indicated with arrows in FIG. 4, bubble mechanism 54 may be driven by motor assembly 50 either directly, or via one of the vehicle's wheel-and-axle assemblies, such as assembly 32.

In FIG. 5, an example of bubble mechanism 54 is shown. Mechanism 54 includes a fan assembly 56 that produces an air stream, which produces, or "blows" bubbles from a rotatable bubble wheel 58. Fan assembly 56 includes a housing 60 in which a fan 62 with plural vanes 64 is rotatably mounted. Housing 60 includes an input 66, such as one or more vents 68 (shown in FIG. 6), through which air is drawn into the fan assembly, and an output 70 through which air is delivered to the bubble wheel. As shown, output 70 includes an elongate passage 72 through which the produced air stream flows.

Fan assembly 56 is rotatably driven by a pulley 74 that is coupled between axle 40 and a pinion 76 on the axle of the fan. In FIG. 5, pulley 74 extends around a pinion 78 on a rotatable gear 80 with teeth that engage the corresponding teeth on pinion 76. Also shown in FIG. 5 is a spacing disc 82 around which the pulley extends on axle 40. It should be understood that the relative speed of rotation of fan 62 compared to axle 40 may be adjusted by varying the size of disc 82 or any of the gears and pinions discussed above.

Figure 6:
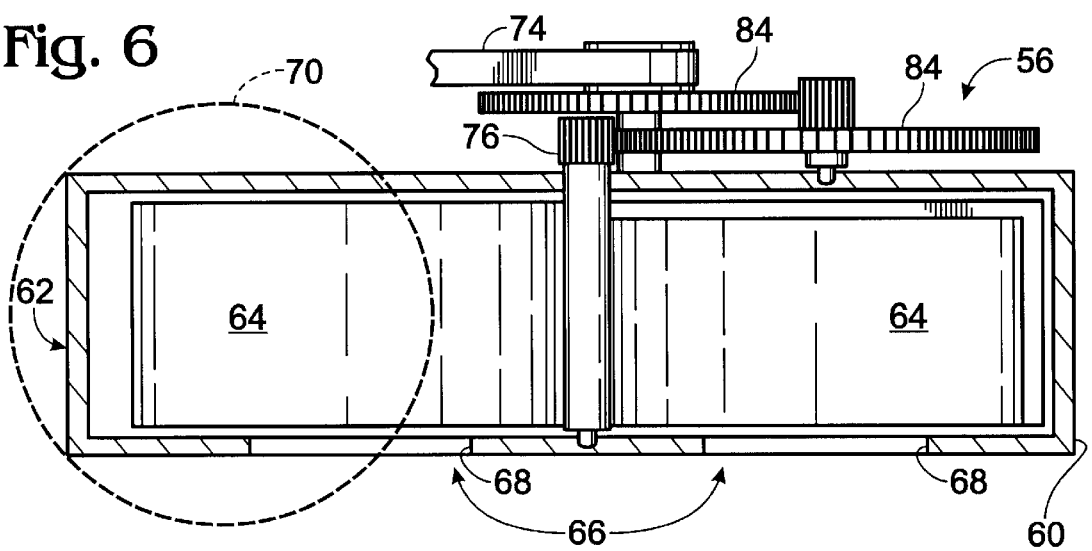
FIG. 6 is an enlarged cross-sectional detail showing another embodiment of the bubble-producing mechanism of FIG. 5.

In some embodiments, it may be desirable to use plural gears to couple the pulley to fan 62, such as shown in FIG. 6. As shown, a pair of interconnected gears 84 are shown. Plural gears may also be used to control the direction of rotation of the fan relative to the drive axle. For example, if the front axle assembly included the driven axle, the fan assembly shown in FIG. 6 could be used to drive fan 62 in the direction to produce the required airflow. It should be understood that the location of output 70 and the configuration of fan 62 and vanes 64 may vary, and that the gearing used to couple the pulley thereto should be selected to produce the desired direction and speed of rotation.

Figure 7:
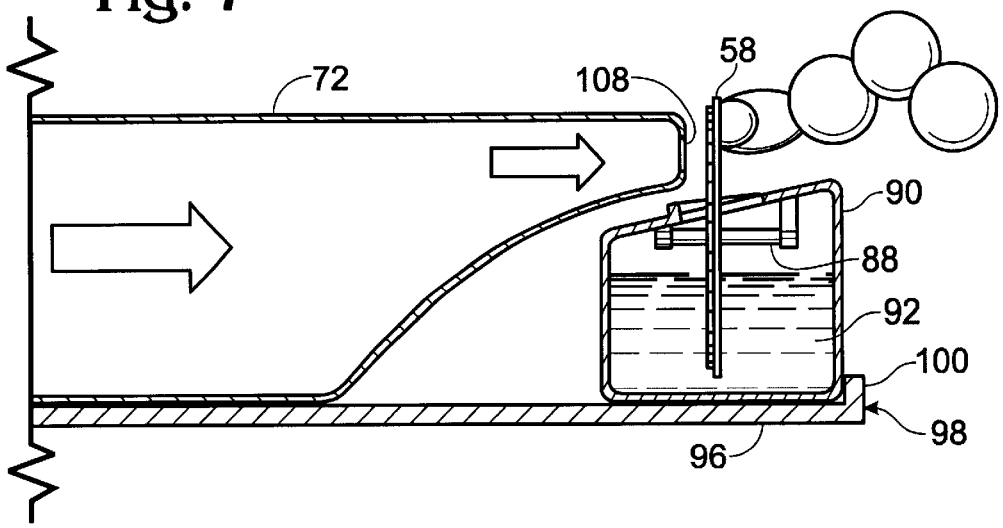
FIG. 7 is an enlarged cross-sectional detail showing the discharge portion of the bubble-producing mechanism of FIG. 5 showing a retainer for preventing unintentional removal of the bubble tray.
Figure 8:
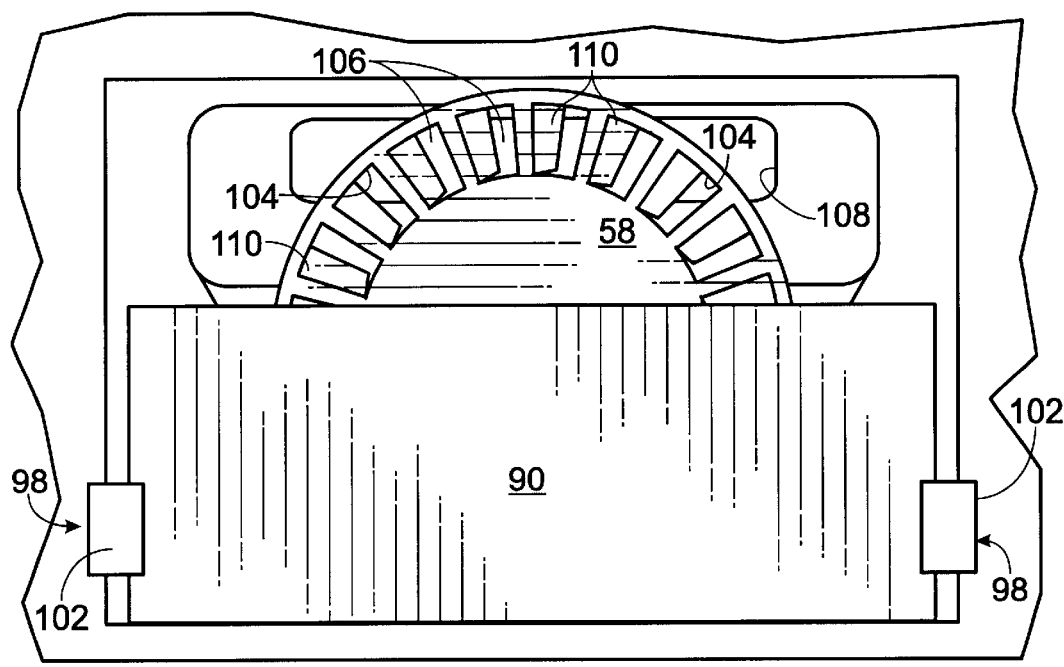
FIG. 8 is a side elevation view of the discharge portion of the bubble-producing mechanism of FIG. 5 and showing another retainer for preventing unintentional removal of the bubble tray.

In FIG. 7, bubble wheel 58 is shown in more detail. As shown, wheel 58 is rotatably mounted on an axle 88. The lower portion of the wheel extends within a bubble tray 90, which is adapted to receive bubble solution 92. Examples of suitable bubble solutions are soapy water and any suitable commercially available liquid for blowing bubbles. Tray 90 is charged with a volume of bubble solution 92 through an opening 94. Preferably, tray 90 is removable for cleaning. As shown in FIG. 7, the tray is supported on a mount 96 that includes a retainer 98 in the form of a lip 100 that prevents unintentional removal of the tray, such as when the vehicle travels over uneven ground. In FIG. 8, another example of a suitable retainer 98 is shown, namely, deformable clips 102 that selectively couple the tray to a portion of vehicle 10.

Figure 9:
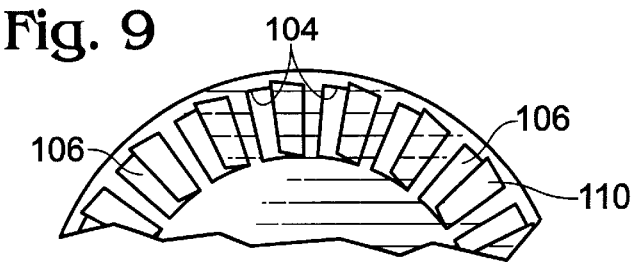
FIG. 9 is a fragmentary detail showing a portion of the bubble wheel of FIG. 8.

As perhaps best seen in FIGS. 8 and 9, bubble wheel 58 includes a plurality of apertures 104 through which air may be blown to produce bubbles. As the bubble wheel is rotated about its axle, a film 106 of bubble solution forms across the apertures as the apertures are drawn out of the bubble solution. As the wheel is further rotated, the airflow exhausted through an outlet 108 of air passage 72 passes through the film-covered apertures to produce bubbles. In the embodiment of bubble wheel 58 shown in FIGS. 7 and 8, the airflow also causes is rotation of the wheel because the wheel includes a plurality of inclined vanes 110, much like on a windmill.

It should be understood that it is within the scope of the invention that the bubble wheel may be rotated by any suitable mechanism. Similarly, the size of outlet 108 may vary, depending upon such factors as the volume and flow-rate of air through passage 72, whether bubble wheel 58 is air-propelled or mechanically propelled, and the size and configuration of the bubble wheel being used. Outlet 108 may also include more than a single orifice, and instead may include a plurality of discrete orifices. For example, a smaller orifice may be used to produce a stronger stream of air, such as to propel the wheel, while a larger orifice may be used to blow bubbles.

It should be understood that the size, number and shape of the vanes and apertures may vary, and that the vanes and apertures may be separately located on the wheel. For example, the apertures may take the form of circular bubble holes, such as used on conventional bubble wands sold with commercially available bottles of bubble solution, and the vanes may extend rearwardly from any suitable location on the bubble wheel.

It should be understood that fan assembly 56 may be coupled to the frame of the vehicle in any suitable location. For example, it may be housed within the body of the vehicle. Alternatively, it may be mounted to the underside of the vehicle. Similarly, the bubble mechanism may be positioned to produce bubbles from other locations on the vehicle. For example, bubbles could be emitted from exhaust pipe 18 to simulate exhaust therefrom.

Figure 10:
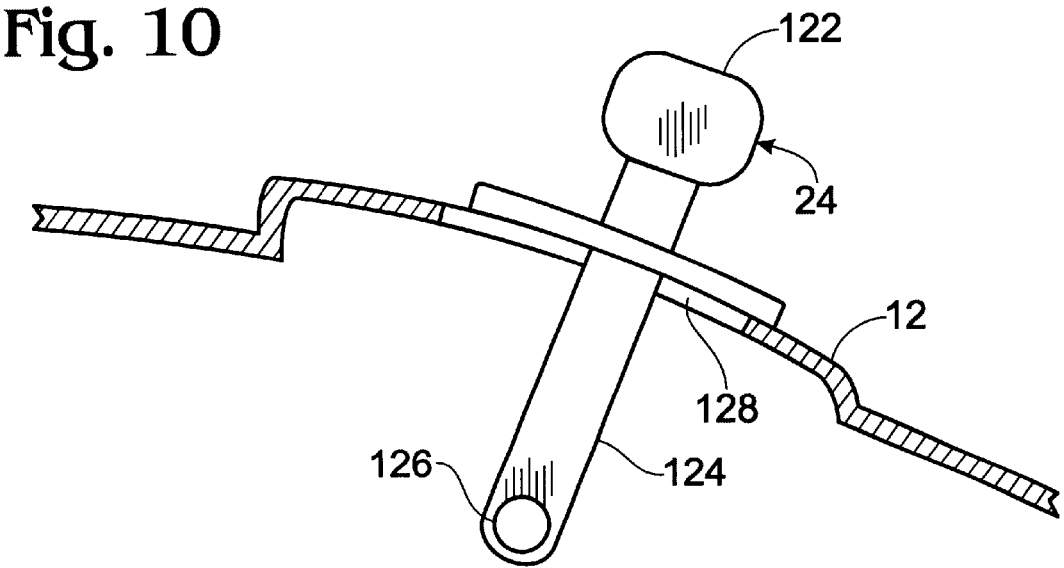
FIG. 10 is an enlarged partial cross-sectional detail showing a portion of the vehicle's housing adapted to receive a bubble wand.

In addition to producing a stream of bubbles to simulate clippings exhausted from a full-size riding lawnmower, ride-on 10 also includes receivers adapted to house a bubble wand and a container of bubble solution so that a child seated on the vehicle may manually produce bubbles. As shown in FIG. 10, the shifter, or shift lever, 24 shown in FIG. 1 is actually a bubble wand. Wand/shifter 24 includes a user-grippable handle 122 from which an elongate stem 124 extends. Stem 124 includes one or more openings 126 through which a film of bubble solution may form when the stem is dipped into and removed from a container of bubble solution. As shown, body 12 of the ride-on includes an elongate slot 128 through which at least a portion of stem 124 is slidably and removably received within. The slot enables a child sitting on seat 14 to slide the "shifter" forward and backward within the slot to simulate shifting of the "lawnmower's" gears. When the child wants to manually blow bubbles, the "shifter" is removed from the slot and used like a conventional bubble wand.

Figure 11:
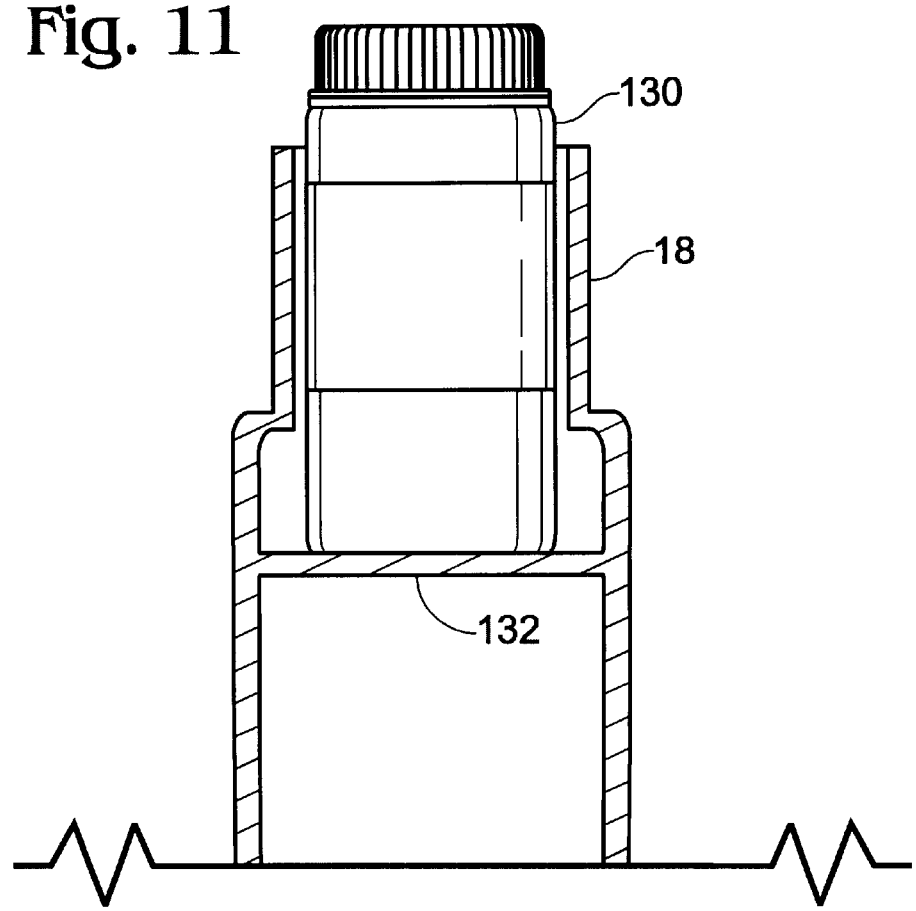
FIG. 11 is an enlarged partial cross-sectional detail showing a portion of the vehicle's housing adapted to receive a bubble container.

Ride-on 10 also includes a receiver for a container of bubble solution. As shown in FIG. 11, "exhaust pipe" portion 18 of body 12 is sized to support a container 130 of bubble solution. Portion 18 includes a support 132 internal the "exhaust pipe" that is positioned to support the container of bubble solution and present the opening of the container at a location where it can be easily reached by a child sitting on seat 14. It should be understood that ride-on 10 may be formed without the bubble wand/shifter and container-supporting exhaust pipe discussed above.

While the invention has been disclosed in its preferred form, the specific embodiments thereof as disclosed and illustrated herein are not to be considered in a limiting sense as numerous variations are possible. It is intended that any singular terms used herein do not preclude the use of more than one of that element, and that embodiments utilizing more than one of any particular element are within the spirit and scope of the present invention. Applicants regard the subject matter of the invention to include all novel and non-obvious combinations and subcombinations of the various elements, features, functions and/or properties disclosed herein. No single feature, function, element or property of the disclosed embodiments is essential to all embodiments.

The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are broader, narrower or equal in scope to the original claims, are also regarded as included within the subject matter of applicants' invention.

We claim:

1. A children's ride-on vehicle, comprising:
   a vehicle body having a seat;
   at least one steerable wheel rotatably coupled to the body;
   a drive assembly;
   at least one driven wheel coupled to the drive assembly and adapted to be rotatably driven thereby; and
   a bubble mechanism chargeable with a volume of bubble solution and adapted to produce bubbles therefrom, wherein the bubble mechanism includes a rotatable bubble wheel, a fan assembly that delivers an airflow to the bubble wheel, and further wherein the bubble wheel is rotationally driven by the airflow.

2. The vehicle of claim 1, wherein the drive assembly includes a battery-powered motor assembly.

3. The vehicle of claim 2, wherein the motor assembly includes at least one motor adapted to selectively drive the at least one driven wheel.

4. The vehicle of claim 2, wherein the motor assembly includes at least one motor adapted to power the bubble mechanism.

5. The vehicle of claim 2, wherein the fan assembly is coupled to the motor assembly and adapted to be rotationally driven by the motor assembly.

6. The vehicle of claim 1, wherein the fan assembly is coupled to the drive assembly and adapted to be rotationally driven thereby.

7. The vehicle of claim 6, wherein the drive assembly includes a driven axle, and further wherein the vehicle includes a pulley coupling the axle to the fan assembly.

8. The vehicle of claim 1, wherein the bubble wheel includes a plurality of vanes adapted to cause rotation of the bubble wheel upon delivery of the airflow from the fan assembly.

9. The vehicle of claim 1, wherein the bubble mechanism further includes a bubble tray that is adapted to receive the volume of bubble solution and the bubble wheel is adapted to extend at least partially within the bubble tray.

10. The vehicle of claim 9, wherein the bubble tray is adapted to be selectively removed from the vehicle.

11. The vehicle of claim 10, further including a retainer adapted to prevent unintentional removal of the bubble tray from the vehicle.

12. The vehicle of claim 11, wherein the retainer includes a projecting lip adapted to prevent the unintentional removal of the bubble tray from the vehicle.

13. The vehicle of claim 11, wherein the retainer includes a releasable clip adapted to prevent unintentional removal of the bubble tray from the vehicle.

14. The vehicle of claim 1, wherein the body includes an aperture adapted to receive a bubble wand, wherein the vehicle further includes a bubble wand adapted to be removably received at least partially within the aperture, and further wherein the aperture is configured to position the bubble wand for access by a child sitting on the seat.

15. The vehicle of claim 14, wherein the aperture is elongate and further wherein the portion of the wand received through the aperture is laterally slidable within the aperture.

16. The vehicle of claim 15, wherein the bubble wand includes a handle portion shaped to resemble a shift lever.

17. The vehicle of claim 14, wherein the body further includes a holder adapted to receive bubble solution and further wherein the holder is positioned for access by a child sitting on the seat.

18. The vehicle of claim wherein 17, the holder is adapted to receive and support a container of bubble solution.

19. The vehicle of claim 17, wherein the bolder is shaped to resemble an exhaust pipe.

20. The vehicle of claim 1, wherein the vehicle further includes a steering mechanism coupled to the at least one steerable wheel and positioned for actuation by a child sitting on the seat.

21. The vehicle of claim 20, wherein the steering mechanism includes a steering wheel positioned for actuation by a child sitting on the seat.

22. The vehicle of claim 20, wherein the steering mechanism includes a handlebar positioned for actuation by a child sing on the seat.

23. The vehicle of claim 1, wherein the bubble wheel includes a plurality of apertures adapted to receive a film of the bubble solution and to produce bubbles therefrom upon receipt of the airflow.

24. A children's ride-on vehicle, comprising:
   a vehicle body having a seat;
   at least one steerable wheel rotatably coupled to the body;
   a drive assembly including a battery-powered motor assembly;
   at least one driven wheel coupled to the drive assembly and adapted to be rotatably driven thereby; and
   a bubble mechanism chargeable with a volume of bubble solution and adapted to produce bubbles therefrom, wherein the bubble mechanism includes a rotatable bubble wheel, a fan assembly that delivers an airflow to the bubble wheel, and further wherein the bubble wheel is rotationally driven by the airflow.

25. The vehicle of claim 24, wherein the means for producing a stream of bubbles is powered by the drive assembly.

26. The vehicle of claim 24, wherein the means for producing a stream of bubbles is adapted to produce bubbles responsive to actuation of the drive assembly.

27. A children's ride-on vehicle, comprising: a
   drive assembly including a battery assembly and a motor assembly in communication with the battery assembly;
   at least one steerable wheel coupled to a steering mechanism that is adapted to enable a user to steer the vehicle;
   at least one driven wheel in communication with the drive assembly and adapted to be rotatably driven by the drive assembly;
   a bubble mechanism adapted to produce bubbles from a bubble solution;
   wherein the bubble mechanism includes a rotatable bubble wheel, a fan assembly that delivers an airflow to the bubble wheel, and further wherein the bubble wheel is rotationally driven by the airflow.
   a vehicle body having a seat adapted to support a child.

28. The vehicle of claim 27, wherein the body includes a region shaped to represent a discharge port of a cutter desk and further wherein the bubble mechanism is adapted to discharge bubbles through the region of the body.

29. The vehicle of claim 27, wherein the drive assembly includes a battery-powered motor assembly.

30. The vehicle of claim 29, wherein the motor assembly includes at least one motor adapted to selectively drive the at least one driven wheel.

31. The vehicle of claim 29, wherein the motor assembly includes at least one motor adapted to power the bubble mechanism.

32. The vehicle of claim 27, wherein the body includes an aperture adapted to receive a bubble wand, wherein the vehicle further includes a bubble wand adapted to be removably received at least partially within the aperture, and further wherein the aperture is configured to position the bubble wand for access by a child sitting on the seat.

33. The vehicle of claim 32, wherein the aperture is elongate and further wherein the portion of the wand received through the aperture is laterally slidable within the aperture.

34. The vehicle of claim 33, wherein the bubble wand includes a handle portion shaped to resemble a shift lever.

35. The vehicle of claim 32, wherein the body further includes a holder adapted to receive bubble solution and further wherein the holder is positioned for access by a child sitting on the seat.

36. The vehicle of claim 35, wherein the holder is adapted to receive and support a container of bubble solution.

37. The vehicle of claim 27, wherein the body includes an exhaust pipe region that is adapted to receive and support a container of bubble solution.

38. The vehicle of claim 15, wherein the bubble wheel includes a plurality of vanes adapted to cause rotation of the bubble wheel upon delivery of the airflow from the fan assembly.

39. The vehicle of claim 38, wherein the bubble wheel includes a plurality of apertures adapted to receive a film of the bubble solution and to produce bubbles therefrom upon receipt of the airflow.

40. The vehicle of claim 15, wherein the fan assembly is coupled to the drive assembly.

41. The vehicle of claim 40, wherein the drive assembly includes a driven axle, and further wherein the vehicle includes a pulley coupling the axle to the fan assembly.

42. A children's ride-on vehicle, comprising:
  a vehicle body having a seat, an aperture positioned for access by a child sitting on the seat, and a holder adapted to receive a volume of bubble solution and positioned for access by a child sitting on the seat;
  a bubble wand adapted to be removably received at least partially within the aperture;
  at least one steerable wheel coupled to a steeling mechanism that is adapted to enable a user to steer the vehicle;
  at least one steerable wheel rotatably coupled to the body;
  a drive assembly;
  at least one driven wheel coupled to the drive assembly and adapted to be rotatably driven thereby; and
  a bubble mechanism chargeable with a second volume of bubble solution and adapted to produce bubbles therefrom wherein the bubble mechanism includes a rotatable bubble wheel, a fan assembly that delivers an airflow to the bubble wheel, and further wherein the bubble wheel is rotationally driven by the airflow.

43. The vehicle of claim 42, wherein the aperture is elongate and further wherein the portion of the wand received through the aperture is laterally slidable within the aperture.

44. The vehicle of claim 42, wherein the bubble wand includes a handle portion shaped to resemble a shift lever.

45. The vehicle of claim 42, wherein the holder is adapted to receive and support a container of bubble solution.

46. The vehicle of claim 42, wherein the holder is shaped to resemble an exhaust chute.

* * * * *

UNITED STATES PATENT AND TRADEMARK OFFICE
CERTIFICATE OF CORRECTION

PATENT NO.    : 6,345,676 B1                                    Page 1 of 1
DATED         : February 12, 2002
INVENTOR(S)   : Kurt J. Huntsberger et al.

It is certified that error appears in the above-identified patent and that said Letters Patent is hereby corrected as shown below:

Column 6,
Line 7, after "The vehicle of claim" delete "wherein 17," and insert -- 17, wherein -- therefor.
Line 9, after "wherein the" delete "bolder" and insert -- holder -- therefor.
Line 20, delete "sing" and insert -- sitting -- therefor.
Line 57, after "by the airflow" delete "." and insert -- ; and -- therefor.

Column 7,
Line 25, delete "claim 15" and insert -- claim 27 -- therefor.
Line 33, delete "claim 15" and insert -- claim 27 -- therefor.

Column 8,
Line 11, after "coupled to a" delete "steeling" and insert -- steering -- therefor.

Signed and Sealed this

Fifteenth Day of October, 2002

Attest:

JAMES E. ROGAN
Attesting Officer                Director of the United States Patent and Trademark Office